July 28, 1953  D. O. NELSON ET AL  2,646,950
OUTBOARD TRANSDUCER ASSEMBLY
Filed March 13, 1950
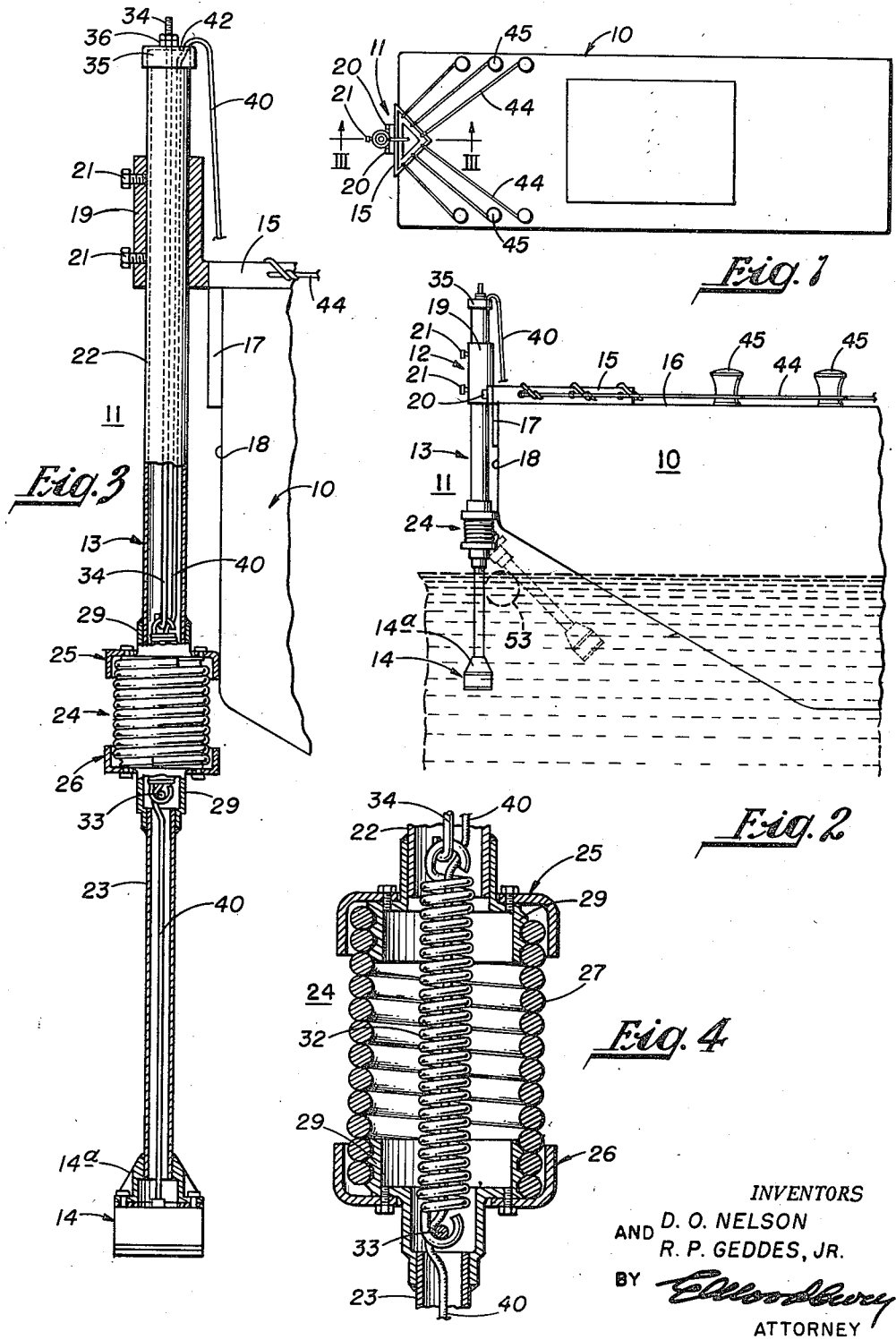
INVENTORS
D. O. NELSON
AND R. P. GEDDES, JR.
BY
ATTORNEY Patented July 28, 1953

2,646,950

UNITED STATES PATENT OFFICE 2,646,950

OUTBOARD TRANSDUCER ASSEMBLY

Donald Owen Nelson, Los Angeles, and Robert Parker Geddes, Jr., Sherman Oaks, Calif., assignors to Bendix Aviation Corporation, South Bend, Ind., a corporation of Delaware Application March 13, 1950, Serial No. 149,312

3 Claims. (Cl. 248—1)

This invention relates to sonic sounding and ranging equipment for watercraft, and more particularly to the mounting on the craft of the transducer that generates and/or receives the sonic waves.

An object of the invention is to provide a transducer assembly that can be easily and inexpensively mounted on and removed from a boat, barge or other watercraft.

Another object is to provide a simple and practicable outboard transducer assembly.

Another object is to provide an outboard transducer assembly that is relatively immune to damage by contact with solid objects either floating or submerged.

Other more specific objects and features of the invention will appear from the description to follow.

Heretofore it has been the usual practice in installing sonic depth sounders on ships to build the transducer into the hull so that it is in contact with the water but does not project beyond the surface of the hull. Such installations are expensive to make and repair since the vessel must usually be beached or placed in drydock for the operation.

In accordance with the present invention a transducer is supported by an outboard mount on one side of or preferably in front of the hull of the vessel. One objection that has been raised against outboard-mounted transducers is that the transducer or its supporting structure may be damaged by impact with solid objects either floating or submerged in the water. This defect has been eliminated, in accordance with the present invention, by supporting the transducer on the lower end of a column extending vertically down into the water, and providing a yieldable joint in the column that permits the lower end portion thereof to be deflected at an angle from the vertical in response to force applied thereto by a foreign solid object. The bending of the column not only reduces the force of impact of the solid object striking the transducer or the column, but also permits the object to slide along the column and be disengaged therefrom instead of hanging up on the column or the transducer.

An important feature of the invention is a preloaded spring joint stiff enough to prevent any deflection of the transducer-supporting column by water currents but capable of yielding through a large angle in response to forces slightly greater than the water current forces. This maintains the transducer in the proper attitude at all times except when the transducer or its supporting column is struck by a solid object, and quickly restores the transducer to the proper attitude when the solid object has passed by.

The invention is particularly useful for use on barges used in river traffic and in other bodies of water that may be relatively shallow. The advantage results from the fact that the transducer may be positioned in front of the hull of the craft so that it indicates the depth of the water at the front end of the craft instead of immediately therebelow. This often enables the navigator to stop or turn the craft and prevents it from grounding.

Another important advantage of the present construction is that it enables the rapid and easy installation or removal of the transducer from a vessel. This is particularly desirable when used on barges, because it is undesirable to have a transducer tied up for each barge irrespective of whether or not the barge is in service. Furthermore, it is common to push a line or string of barges with a single tug, in which case only one transducer mounted on the forward barge suffices for the whole string. However, it is desirable to be able to quickly shift the transducer from the leading barge to another barge when the leading barge is removed from the string.

A particular structure in accordance with the invention will now be described with reference to the drawing, in which:

Fig. 1 is a plan view of a barge equipped with a transducer assembly in accordance with the invention;

Fig. 2 is a side elevation of the forward end of the barge and the transducer assembly mounted thereon;

Fig. 3 is an enlarged side elevation view of the transducer assembly of Figs. 1 and 2, part of the assembly being shown in vertical section; and Fig. 4 is an enlarged vertical sectional view through the flexible joint in the transducer support column of Fig. 3.

Referring to Figs. 1 and 2, there is shown a typical square front barge 10 having a transducer assembly 11 in accordance with the invention mounted on the front end thereof.

This assembly includes a bracket 12 directly attachable to the barge 10, and a column 13 supported near its upper end by the bracket 12 and having a transducer 14 on its lower end.

The bracket 12 includes a triangular base member 15 adapted to lie on the deck 16 of the barge and having at its front edge a pair of laterally spaced-apart downwardly depending lips 17 adapted to lie against the front end 18 of the barge. The base member 15 can be secured to the deck in any desired manner but where a temporary installation is desired, as is usually the case on a barge, it can be lashed in place by lines 44 extending to anchoring points such as the usual bitts 45. The bracket 12 also includes a column-engaging portion consisting of vertical tubular member or sleeve 19, which is secured to the member 15 as by bolts 20. The column 13 extends through and is locked to the sleeve 19 by cap screws 21.

The column 13 is formed of two sections 22 and 23, respectively, joined together by a flexible joint means 24 which permits the lower section 23 to deflect in response to impact with an obstacle 53, as shown in dotted lines in Fig. 2.

The upper and lower column sections 22 and 23 are preferably tubular elements, and the lower end of the upper section 22 is connected to a spring seat 25, and the upper end of the lower section 23 is connected to a spring seat 26. These spring seats 25 and 26 are secured to the upper and lower ends respectively of a stiff helical spring 27. As shown in Fig. 4, each of the spring seats 25 and 26 may include a male element 29 which extends into one end of the spring 27 and is tightly engaged thereby, each member 29 having threads formed in its outer surface to fit the spring.

The spring 27 is not only relatively heavy but is of the preloaded type, that is, successive turns of the spring are in direct contact with each other, and a substantial tensil force must be applied to opposite ends of the spring before the turns separate. Hence this spring alone offers substantial resistance to bending movement of the coupling. However, it is usually desirable to increase the resistance of the spring 27 to bending by applying auxiliary force urging the spring in compression.

This auxiliary force is provided by a tension helical spring 32 positioned inside of the spring 27 and anchored to the lower and upper column sections. The lower end of the spring 32 may be conveniently anchored directly to the lower spring seat as by a cross pin 33 extending therethrough. The upper end can be similarly connected to the upper spring seat 25 if a fixed adjustment is desired. However, in most instances it is desirable to be able to adjust the resistance of the coupling to bending, and to accomplish this, the upper end of the spring 32 may be connected to the lower end of a rod 34 that extends through the upper column section 22 and is threaded at its upper end and extended through a cap 35 on the upper end of the upper column section 22. A nut 36 on the threaded upper end of the rod 34 can be tightened or loosened to vary the tension in the spring 32 and thereby vary the stiffness of the coupling. The cap 35 prevents the upper column section 13 from dropping through the sleeve 19 should the cap screws 21 fail.

In general it is desirable to have the joint means 24 no stiffer than is necessary to maintain the lower column section 23 vertical against the maximum force of the current, which of course is determined by the speed of the craft to which the device is attached. Adjustment of the nut 36 can therefore be made to give just sufficient stiffness to the joint means to resist the force of the current. With such adjustment, whenever the lower column section 23 or the transducer 14 on the lower end thereof contacts a foreign object in the water it will readily yield to reduce the force of the impact and to permit the foreign object to slip past the column 23 and be released, whereupon the joint means 24 returns the lower column section 23 to vertical position.

To reduce the strain on the bracket 12 it is desirable to have the upper spring seat 25 rest against the front end 18 of the barge, as shown in Fig. 2.

The internal construction of the transducer 14 is immaterial to the present invention. However, it is desirable that the transducer casing have a tapered upper end, as indicated at 14a, to streamline it and prevent it from hooking onto and retaining a foreign object. Electrical connection to the transducer may be made by an electrical cable 40 extending up through the lower column section 23 and through the inner spring 32 and the upper column section 22, an opening 42 being provided in the cap 35 through which the cable 40 is brought out.

The vertical adjustment of the upper column section 22 in the sleeve 19 is desirable not only to adapt a given transducer assembly for use on craft of different heights, but also to permit adjustment for variation in draft of a given craft by virtue of a change in its loading.

The joint means 24 can bend in any direction, which enables the lower column section 23 to disengage from a floating log or the like approaching at an angle more readily than if the coupling could bend only in a fore and aft plane.

Although for the purpose of explaining the invention, a particular embodiment thereof has been shown and described, obvious modifications will occur to a person skilled in the art, and we do not desire to be limited to the exact details shown and described.

We claim:

1. An underwater-transducer assembly for mounting on a watercraft having a deck positioned above the water line, said assembly comprising: an integral supporting bracket having a base portion adapted to be anchored to said deck and having a column-engaging portion adapted to extend in outboard relation to said deck; a vertical transducer-supporting column; an underwater-transducer secured to the lower end of said column; and means for vertically adjustably securing said column to said column-engaging portion of said supporting bracket, whereby said transducer can be set a predetermined distance below the water line.

2. An assembly according to claim 1 in which said base portion of said bracket comprises a horizontal member for resting on the deck and a downwardly depending lip on one edge thereof for engaging the side of the craft below the deck, whereby said bracket can be detachably anchored to the craft by horizontal lashings extending inboard therefrom.

3. An assembly according to claim 1 in which said column comprises an upper section connecting to said bracket and a lower section connected to said transducer, and flexible joint means interconnecting the lower end of said upper section and the upper end of the lower section, said joint means being normally straight and bending only in response to forces exceeding a predetermined magnitude.

DONALD OWEN NELSON.
ROBERT PARKER GEDDES, Jr.

(References on following page)

References Cited in the file of this patent

UNITED STATES PATENTS

| Number | Name | Date |
|---|---|---|
| 547,342 | Foster | Oct. 1, 1895 |
| 808,528 | Finney et al. | Dec. 26, 1905 |
| 903,242 | Thayer | Nov. 10, 1908 |
| 1,007,311 | Pons | Oct. 31, 1911 |
| 1,194,746 | Keeler | Aug. 15, 1916 |
| 1,358,640 | Koyama | Nov. 9, 1920 |
| 1,716,220 | Ferguson | June 4, 1929 |
| 1,762,966 | Ellinger | June 10, 1930 |
| 2,085,161 | Kraus | June 29, 1937 |
| 2,144,038 | Trump | Jan. 17, 1939 |
| 2,482,575 | Cohn | Sept. 20, 1949 |
| 2,520,861 | Stone | Aug. 29, 1950 |